United States Patent
Innocenti et al.

(10) Patent No.: US 8,899,930 B2
(45) Date of Patent: Dec. 2, 2014

(54) FAN

(75) Inventors: Piergiorgio Innocenti, Asti (IT); Davide Parodi, Asti (IT)

(73) Assignee: Gate S.R.L., Turin (IT)

( * ) Notice: Subject to any disclaimer, the term of this patent is extended or adjusted under 35 U.S.C. 154(b) by 555 days.

(21) Appl. No.: 13/357,945

(22) Filed: Jan. 25, 2012

(65) Prior Publication Data

US 2012/0189451 A1    Jul. 26, 2012

(30) Foreign Application Priority Data

Jan. 25, 2011   (IT) .............. TO2011A0058

(51) Int. Cl.
| F04D 29/32 | (2006.01) |
| B60K 11/02 | (2006.01) |
| F04D 25/08 | (2006.01) |
| B60K 11/04 | (2006.01) |

(52) U.S. Cl.
CPC .............. *B60K 11/02* (2013.01); *F04D 25/082* (2013.01); *B60K 11/04* (2013.01)
USPC ........ 416/169 A; 416/175; 416/203; 416/228; 416/244 R; 415/143

(58) Field of Classification Search
USPC ................. 416/169 A, 175, 203, 228, 244 R; 415/143
See application file for complete search history.

(56) References Cited

U.S. PATENT DOCUMENTS

| 3,303,995 | A | * | 2/1967 | Boeckel ................ 417/353 |
| 3,385,516 | A | * | 5/1968 | Omohundro ............... 416/93 R |
| 3,819,294 | A | * | 6/1974 | Honnold et al. ........... 416/93 R |
| 5,577,888 | A | * | 11/1996 | Capdevila et al. ......... 415/210.1 |
| 5,871,335 | A | * | 2/1999 | Bartlett .................... 416/244 R |
| 6,065,937 | A | * | 5/2000 | Hunt ........................... 416/189 |
| 6,384,494 | B1 | | 5/2002 | Avidano et al. |
| 7,585,159 | B2 | | 9/2009 | Caplan et al. |
| 7,598,634 | B2 | | 10/2009 | Izumi |
| 7,977,831 | B2 | | 7/2011 | De Filippis et al. |
| 8,016,574 | B2 | * | 9/2011 | De Filippis et al. ....... 417/423.8 |
| 8,091,177 | B2 | * | 1/2012 | Cote et al. ................... 16/203 |
| 8,651,814 | B2 | * | 2/2014 | Nicgorski et al. .......... 416/93 R |

* cited by examiner

*Primary Examiner* — Igor Kershteyn
(74) *Attorney, Agent, or Firm* — Muncy, Geissler, Olds & Lowe, P.C.

(57) ABSTRACT

A fan, for a ventilation assembly has blades extending from a cup-shaped central hub. The hub has an annular side wall and a bottom wall defining a receptacle for an electric motor. The hub has internal ribs for ventilation of the motor. Each rib has a longitudinal portion which extends along the side wall, a radial portion which extends along the bottom wall and an intermediate portion having an arcuate, transversely protruding profile. The longitudinal portion has a profile whose spacing from the side wall of the hub increases, from a minimum value remote from the bottom wall to a maximum value adjacent the bottom wall.

9 Claims, 5 Drawing Sheets

FAN

CROSS REFERENCE TO RELATED APPLICATIONS

This non-provisional patent application claims priority under 35 U.S.C. §119(a) from Patent Application No. TO 2011 A 000058 filed in Italy on Jan. 25, 2011.

FIELD OF THE INVENTION

This invention relates to a fan and in particular, to a fan for a ventilation assembly for a heat exchanger, for example a radiator, of a motor vehicle.

More specifically, the invention relates to a fan of the type comprising a plurality of angularly spaced external blades which extend from a central hub which is substantially cup-shaped and which has an annular side wall and a bottom wall and which internally defines a housing which is capable of at least partially receiving an electric motor for driving the fan. The hub further being provided with a plurality of internal ribs for the ventilation of the motor, each of which has a longitudinal portion which extends from the side wall of the hub and a radial portion which extends from and along the bottom wall of the hub.

BACKGROUND OF THE INVENTION

FIG. 1 of the appended drawings illustrates a fan of that type which is constructed in accordance with the prior art. The fan which is generally designated 1 comprises a plurality of external blades 2 which extend from a central hub 3 of cup-like form. The hub has an annular side wall 3a and a bottom wall 3b. The internal ribs or blades 4 of the hub have a longitudinal portion 4a which extends from the side wall 3a of the hub, and a radial portion 4b which extends from and along the bottom wall 3b of that hub. See also FIG. 3 in which such an internal rib according to the prior art is shown.

The internal ribs 4 extend between the side wall 3a of the hub 3 and a central projection 5 of the bottom wall 3b thereof which can be used for keying the shaft of the motor (not illustrated).

As can be seen more clearly in FIG. 3, the profile of each internal rib 4 according to the prior art is substantially L-shape: the longitudinal portion 4a of the blade has a profile approximately parallel with the side wall 3a, except at one end where it is "radial" and concave in order to connect the two portions of the blade, and at the other end in which it is convex arcuate. The extent of the longitudinal portion 4a in the direction transverse to the axis A-A (FIG. 3) of the hub 3 is clearly more pronounced than the extent of the radial portion 4b in the direction substantially parallel with that axis.

In the fan according to the prior art described above, the formation of the internal ribs 4 of the hub 3 is such that the fan has high losses owing to the ventilator effect: the longitudinal portion 4a of the blades 4 brings about the application of a substantial resistance torque with respect to the electric motor. Furthermore, whilst the efficiency of ventilation of the motor may be limited, the additional load owing to the losses is "perceived" by the electric motor as an additional resistance torque.

SUMMARY OF THE INVENTION

Hence there is a desire for an improved fan which allows the disadvantages of conventional fans set out above to be overcome or at least mitigated.

This is achieved in the present invention by using a fan in which each internal rib is a centrifugal vane which has an intermediate portion having an arcuate profile which protrudes transversely; the longitudinal portion of each internal rib having a profile whose spacing from the side wall of the hub increases in an approximately linear manner from a minimum value remote from the bottom wall of the hub to a maximum value towards the bottom wall of the hub.

Accordingly, in one aspect thereof, the present invention provides a fan, particularly for a ventilation assembly for a heat exchanger for a motor vehicle, comprising a plurality of angularly spaced external blades, which extend from a substantially cup-shaped central hub, the hub having an annular side wall and a bottom wall and defining internally a receptacle adapted to receive, at least partially, an electric motor; the hub further being provided with a plurality of internal ribs for ventilation of the motor, each rib having a longitudinal portion which extends from the side wall of the hub, and a radial portion which extends from and along the bottom wall of the hub, wherein each internal rib has an intermediate portion having a substantially arcuate, transversely protruding profile; the longitudinal portion of each internal rib having a profile whose spacing from the side wall of the hub increases, in an at least approximately linear manner, from a minimum value remote from the bottom wall of the hub to a maximum value adjacent the bottom wall.

Preferably, the profile of the longitudinal portion of each internal rib is substantially concave.

Preferably, the internal ribs of the hub have, in plan view, a radially innermost end which is substantially tangential to a circumference which is coaxial with the hub.

Preferably, the internal ribs of the hub have, in plan view, an arcuate profile without any inflection points.

Preferably, the internal ribs of the hub have, in plan view, a curved radially inner portion, a substantially rectilinear intermediate portion and a curved radially outermost portion.

Preferably, the longitudinal and intermediate portions of each internal rib are, in plan view, curved; the radial portion of each rib having, in plan view, a radially inner portion which is curved, and a radially intermediate portion which is substantially rectilinear.

Preferably, the radially inner portion and the intermediate portion of each rib, when viewed from above, each have a radial extent which is at least approximately equal to a quarter of the total radial extent of the rib.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
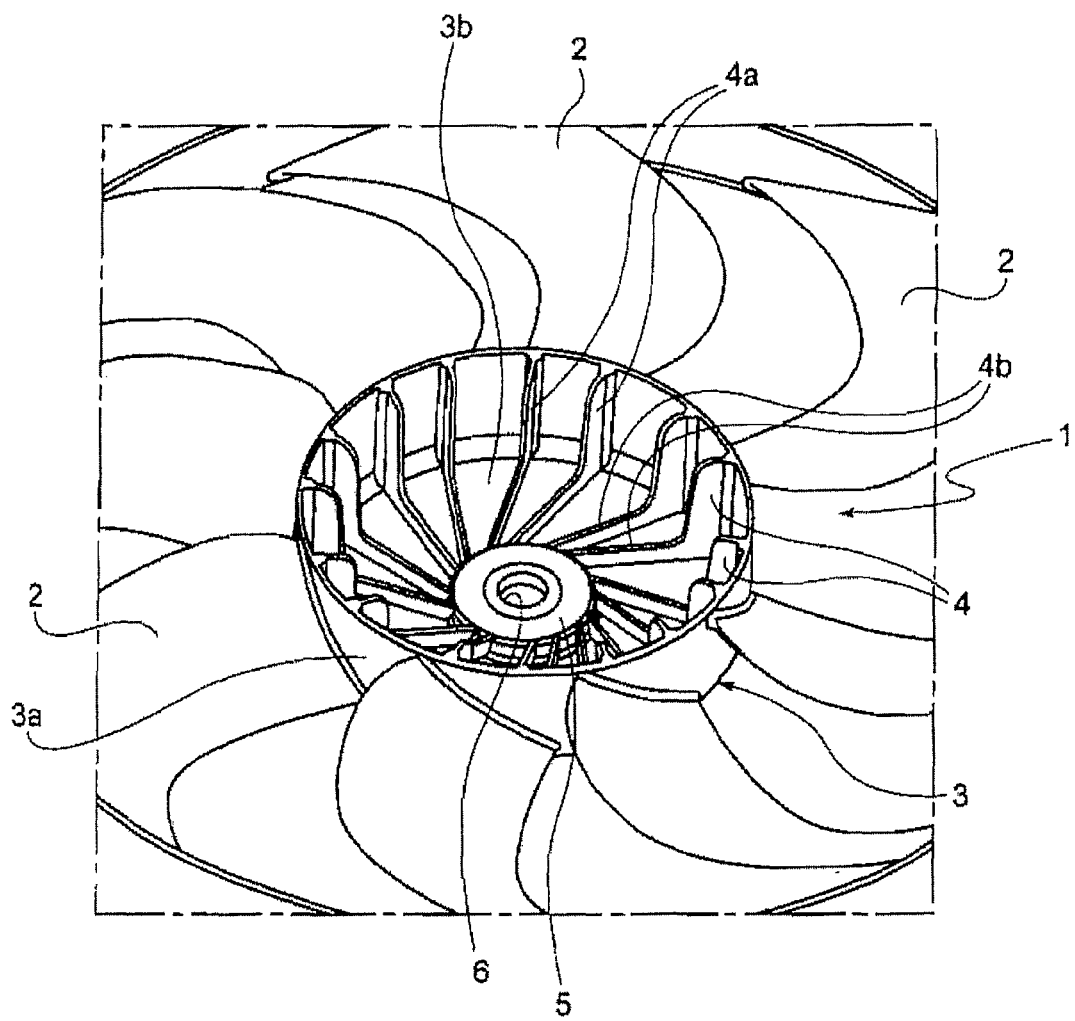
FIG. 1, which has already been described, is a partial perspective view of a fan according to the prior art.
Figure 2:
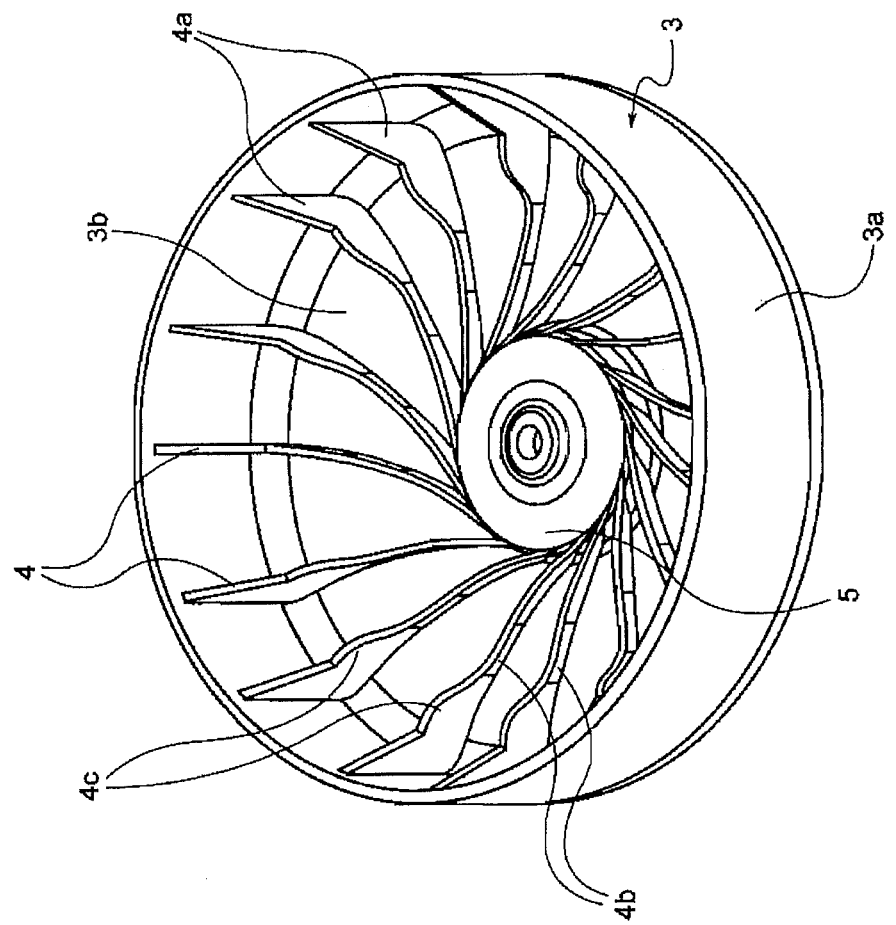
FIG. 2 is a perspective view which shows a hub for a fan according to the present invention.
Figure 3:
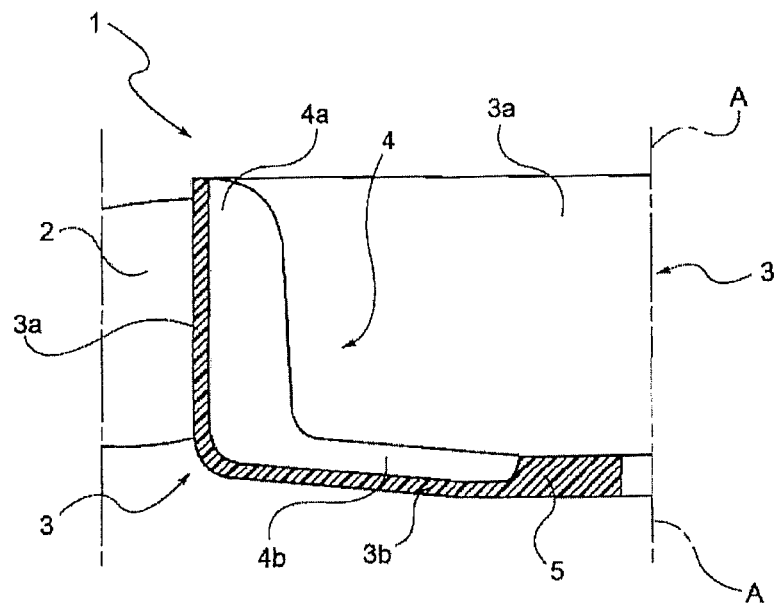
FIG. 3, which has also already been described, is an axial sectional view of part of the prior art fan of FIG. 1.
Figure 4:
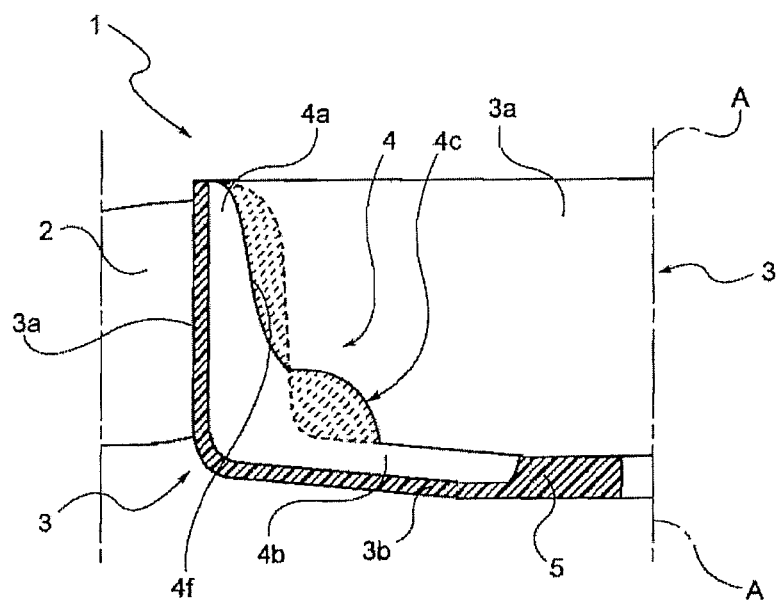
FIG. 4 is an axial section of part of a fan according to the present invention.

With reference to FIGS. 2 and 4, in a fan according to the present invention, each internal rib 4 of the hub 3 has an intermediate portion 4c having a convex arcuate profile which projects transversely.

The longitudinal portion 4a of each rib 4 has a profile 4f whose spacing from the side wall 3a of the hub 3 increases in an at least approximately linear manner from a minimum value, close to zero, at the end remote from the bottom wall 3b of the hub 3, to a maximum value towards the bottom wall.

FIG. 4 also illustrates with hatching the corresponding profile of an internal rib 4 according to the prior art. FIG. 4 makes it clear that, in the fan according to the present invention, with a surface of the ribs 4 substantially equal to or less than conventional internal ribs, there is a "movement" of a portion of the surface of the rib towards the axis A-A of the hub 3 and towards the bottom wall 3b of the hub. Owing to that feature, the moment of inertia of the hub 3 is reduced and the resistance torque applied to the motor driving the fan is reduced during the acceleration phases.

The main result of the above-described feature involves improving the forced ventilation of the motor. The hub 3 of the fan further has a high level of structural rigidity. With particular reference to FIG. 4, the profile 4f of the longitudinal portion 4a of each internal rib 4 may be slightly concave.

Figure 5:
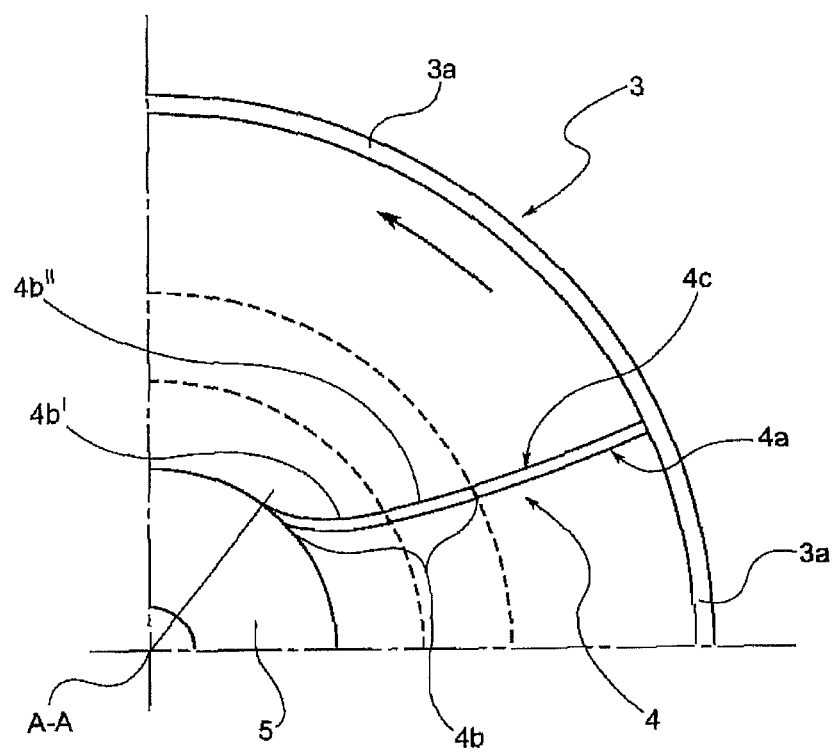
FIG. 5 is a graph which shows the course, in a plan view, of an internal blade of a fan according to the present invention.

Reference will now be made to FIG. 5, which schematically illustrates substantially as a plan view a quarter of a hub 3 of a fan according to the invention. As can be seen in FIG. 5, each internal rib 4 of the hub 3 advantageously has, when viewed from above, the innermost end which is substantially tangential relative to a circumference (central projection 5) coaxial with the axis A-A of the hub and a radially outermost end 4a of each rib which is instead substantially orthogonal to the side wall 3a of the hub.

Generally, the internal ribs 4 of the hub 3 have, when viewed from above, an arcuate profile which does not have any points of inflection. In particular, each rib 4 has, when viewed from above, a curved radially inner portion 4b', a substantially rectilinear intermediate portion 4b" and a radially more external portion 4c+4a which is also curved.

In other words, the above-mentioned external portion 4a and intermediate portion 4c of each internal rib 4 of the hub 3 are, when viewed from above, curved and the internal portion 4b has, when viewed from above, a radially innermost portion 4b' which is curved and a radially outermost portion 4b" which is substantially rectilinear.

As will be appreciated from FIG. 5, the above-mentioned radially inner portion 4b' and intermediate portion 4b" of each rib 4 advantageously, each have an extent in the radial direction, when viewed from above, which is at least approximately equal to one quarter of the total radial extent of the rib 4.

Figure 6:
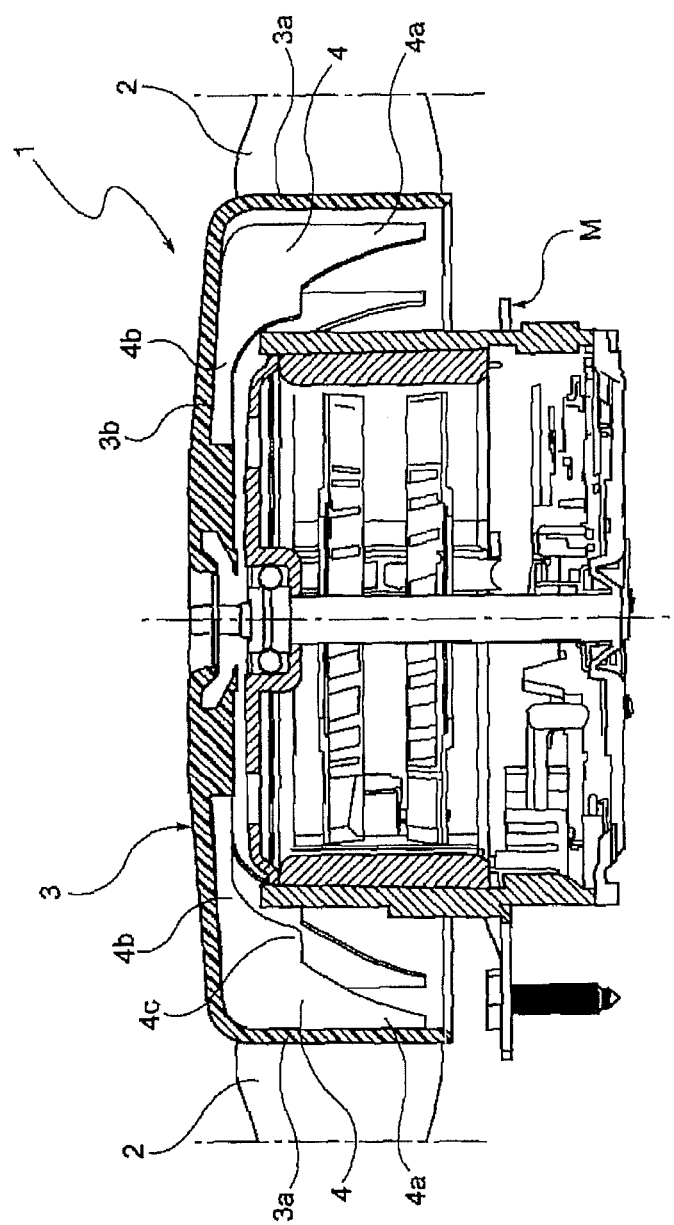
FIG. 6 is an axial section of part of a motorized ventilator comprising a fan according to the invention.

FIG. 6 is an axial section of part of a motorized ventilator comprising a fan 1 according to the invention which is connected to an electric motor which is generally designated M.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A fan, for a ventilation assembly for a heat exchanger for a motor vehicle, comprising a plurality of angularly spaced external blades, which extend from a substantially cup-shaped central hub, the hub having an annular side wall and a bottom wall and defining internally a receptacle adapted to receive, at least partially, an electric motor; the hub further being provided with a plurality of internal ribs for ventilation of the motor, each rib having a longitudinal portion which extends from the side wall of the hub, and a radial portion which extends from and along the bottom wall of the hub,
wherein each internal rib has an intermediate portion having a substantially arcuate, transversely protruding profile; the longitudinal portion of each internal rib having a profile whose spacing from the side wall of the hub increases, in an at least approximately linear manner, from a minimum value remote from the bottom wall of the hub to a maximum value adjacent the bottom wall.

2. The fan of claim 1, wherein the profile of the longitudinal portion of each internal rib is substantially concave.

3. The fan of claim 2, wherein the internal ribs of the hub have, in plan view, a radially innermost end which is substantially tangential to a circumference which is coaxial with the hub.

4. The fan of claim 3, wherein the internal ribs of the hub have, in plan view, an arcuate profile without any inflection points.

5. The fan of claim 4, wherein the internal ribs of the hub have, in plan view, a curved radially inner portion, a substantially rectilinear intermediate portion and a curved radially outermost portion.

6. The fan of claim 5, wherein the longitudinal and intermediate portions of each internal rib are, in plan view, curved; the radial portion of each rib having, in plan view, a radially inner portion which is curved, and a radially intermediate portion which is substantially rectilinear.

7. The fan of claim 5, wherein the radially inner portion and the intermediate portion of each rib, when viewed from above, each have a radial extent which is at least approximately equal to a quarter of the total radial extent of the rib.

8. The fan of claim 6, wherein the radially inner portion and the intermediate portion of each rib, when viewed from above, each have a radial extent which is at least approximately equal to a quarter of the total radial extent of the rib.

9. The fan of claim 1, wherein the internal ribs of the hub have, in plan view, a radially innermost end which is substantially tangential to a circumference which is coaxial with the hub.

* * * * *